United States Patent Office 2,722,655
Patented Nov. 1, 1955

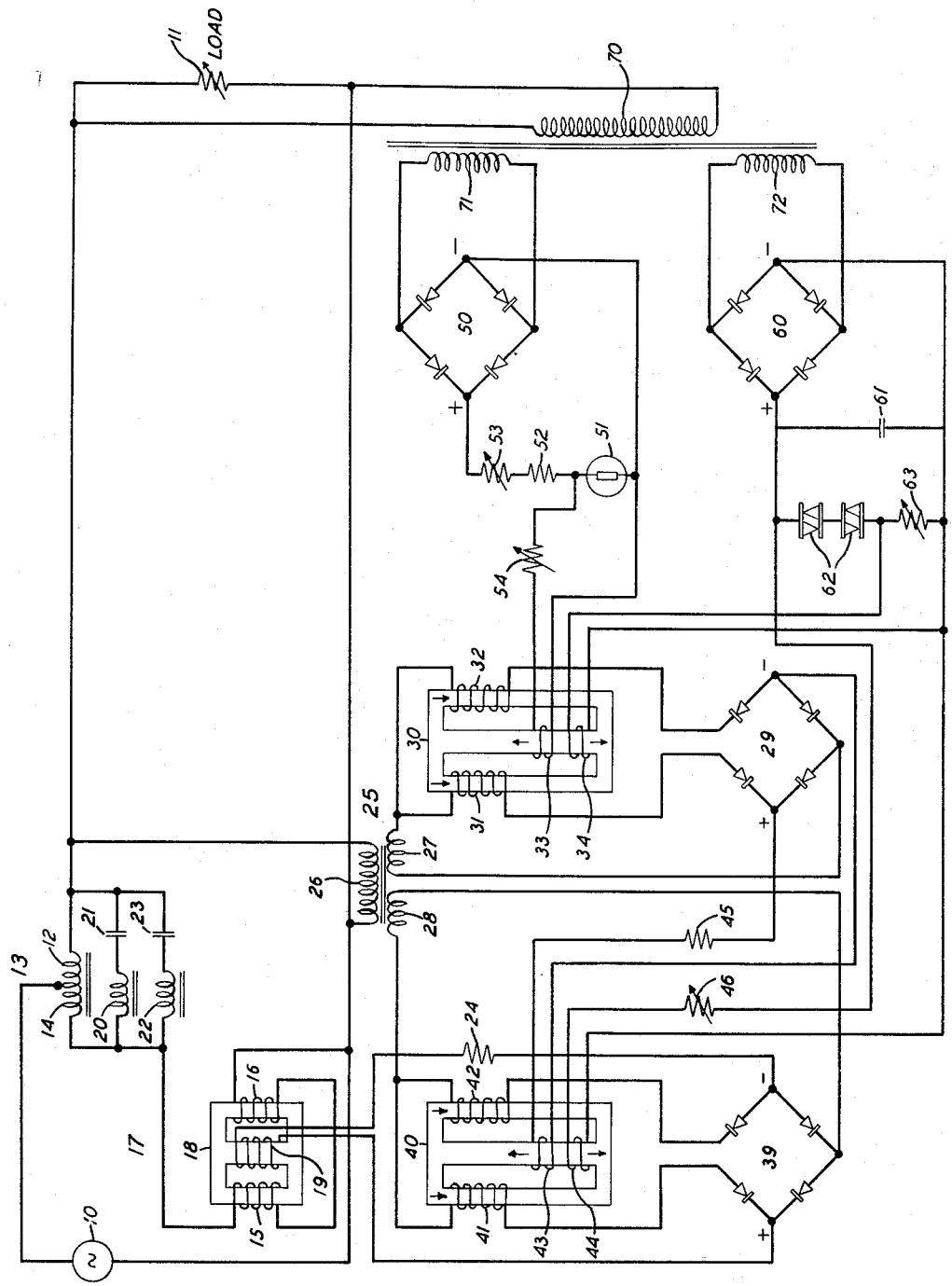

2,722,655

LINE VOLTAGE REGULATOR

Frederic W. Anderson, Lynbrook, N. Y., assignor to Bell Telephone Laboratories, Incorporated, New York, N. Y., a corporation of New York Application April 10, 1953, Serial No. 348,003

5 Claims. (Cl. 323—60)

This invention relates to electric regulators and particularly to a regulator for maintaining substantially constant the voltage across a load to which current is supplied from an alternating-current supply source.

An object of the invention is to provide an improved alternating-current line voltage regulator.

In an embodiment of the invention, herein shown and described for the purpose of illustration, a load is coupled to an alternating-current supply source through a buck-boost autotransformer circuit which may increase or decrease the load voltage with respect to the supply voltage so as to maintain the load voltage substantially constant. For this purpose there are provided a saturable reactor having an impedance or power winding for controlling the current supplied from the supply source to the primary of the autotransformer, the impedance of the impedance winding being controlled by current supplied from a magnetic amplifier to a saturating or control winding of the saturable reactor, the magnetic amplifier being energized by current supplied from the load circuit.

Each magnetic amplifier stage comprises a rectifying means and a saturable reactor having an impedance winding and two saturating windings for setting up opposed magnetomotive forces in a core to control the impedance of the impedance winding. A substantially constant direct reference voltage derived from the load circuit is impressed upon one of these saturating windings. For energizing the other of these saturating windings, there is derived from the load circuit a direct voltage which varies in response to load voltage changes and the percentage voltage variation of which is large with respect to the corresponding percentage voltage change across the load.

The invention will now be described in greater detail with reference to the accompanying drawing the single figure of which is a schematic view of a line voltage regulator embodying the invention.

Referring to the drawing, current is supplied from an alternating-current supply source 10 to a load 11 through the secondary 12 of an autotransformer 13. Current is supplied from source 10 to the primary 14 of the autotransformer through the impedance windings 15 and 16, in series, of a saturable reactor 17. The windings 15 and 16 preferably have equal turns and are wound on the outer legs, respectively, of a three-legged core 18 of magnetic material and there is also provided a saturating winding 19 wound on the middle leg of the core for controlling the impedance of the windings 15 and 16. The filters, one of which comprises inductance element 20 and condenser 21, in series, and the other of which comprises inductance element 22 and condenser 23, in series, are connected across the autotransformer windings 12 and 14 for suppressing the third and fifth harmonics, respectively, of the frequency of source 10 to thereby improve the wave form of the voltage across the load 11. Current is supplied to the saturating winding 19 from the second stage of a two-stage magnetic amplifier which is energized by current supplied from source 10 through a transformer 25 having a primary 26 connected across the load 11 and two secondary windings 27 and 28. The first magnetic amplifier stage comprises a rectifier 29 and a saturable reactor having a three-legged core 30 of magnetic material, impedance windings 31 and 32 on the outer legs, respectively, of the core and saturating windings 33 and 34 on the middle leg of the core. The second stage magnetic amplifier comprises a rectifier 39 and a saturable reactor having a three-legged core 40 of magnetic material, impedance windings 41 and 42 on the outer legs, respectively, of the core and saturating windings 43 and 44 on the middle leg of the core. The impedance windings 31 and 32 preferably have equal turns and windings 41 and 42 have equal turns. There are provided a reference voltage circuit comprising a rectifier 50 for supplying a substantially constant reference current to the saturating winding 33 and a control circuit comprising a rectifier 60 for supplying to saturating winding 34 a direct current which varies in response to load voltage variations and the percentage variation of which is larger than the corresponding percentage variation of the load voltage.

There is provided a transformer having a primary winding 70 connected across the load 11 and secondary windings 71 and 72. The winding 71 is connected to the input terminals of rectifier 50 and the winding 72 is connected to the input terminals of rectifier 60. Where the load voltage is 115 volts, for example, the voltage across the secondary 71 may be 220 volts and the voltage across secondary 72 may be 180 volts, for example. Across the output terminals of rectifier 50 is connected to current path comprising, in series, a thermistor 51, a temperature compensating resistor 52 and a variable resistor 53. The thermistor 51 has the characteristic that its resistance decreases as the current through it is increased at such a rate that the voltage across the thermistor remain substantially constant over an operating range. The resistance of resistor 52 changes with changes of ambient temperature to prevent voltage changes across thermistor 51 in response to ambient temperature changes. The terminals of thermistor 51 are connected to the saturating winding 33 through a variable reistor 54 for adjusting the current in winding 33.

Two parallel paths are connected across the output of rectifier 60, the one path comprising a filtering condenser 61 and the other path comprising symmetrical varistors 62 and a variable resistor 63 in series. The varistors 62 provide a stable voltage across the terminals thereof since, in its operating region, a varistor is essentially a constant voltage device. The voltage across the resistor 63 is equal to the output voltage of rectifier 60 minus the substantially constant voltage across the varistors 62. Since the output voltage of rectifier 60 varies in response to and in proportion to the load voltage variations, the voltage across resistor 63 will also vary in response to load voltage changes, but the percentage variation of the voltage across resistor 63 will be large with respect to the percentage variation of the load voltage. The control voltage across resistor 63 is impressed upon the saturating winding 34 to set up in the core 30 a unidirectional magnetomotive force which is in opposition to the unidirectional magnetomotive force set up in the core in response to the substantially constant current supplied to winding 33.

Current from secondary transformer winding 27 is supplied to a circuit comprising impedance windings 31 and 32, rectifier 29, resistor 45 and saturating winding 43. The output voltage of rectifier 60 is impressed upon a circuit comprising variable resistor 46 and saturating winding 44 in series. The currents supplied to impedance windings 31 and 32 and saturating winding 43 are unidirectional pulsating currents, current flowing through winding 31 during half-cycle periods of one polarity of the alternating voltage across transformer winding 27 and current flowing through winding 32 during half-cycle periods of the other polarity. The windings 31 and 32 are so wound on the core that the magnetomotive forces set up in the core by these windings, respectively, are in aiding relationship with respect to the magnetomotive force set up by current in winding 33, as indicated by the arrows on the drawing.

Current from secondary transformer winding 28 is supplied to a circuit comprising impedance windings 41 and 42, rectifier 39, resistor 24 and saturating winding 19 of reactor 17. The current supplied to impedance windings 41 and 42 and saturating winding 19 are unidirectional pulsating currents, current flowing through impedance winding 41 during half-cycle periods of one polarity of the alternating voltage across transformer winding 28 and current flowing through impedance winding 42 during half-cycle periods of the other polarity. The currents supplied to windings 43 and 44, respectively, set up opposed unidirectional magnetomotive forces in the core 40 and the currents supplied to windings 41 and 42, respectively, set up pulsating unidirectional magnetomotive forces which are in aiding relationship with respect to the magnetomotive force set up by the current supplied to winding 43, as indicated by the arrows.

For a predetermined load voltage, the ampere turns of windings 33 and 34, respectively, are substantially equal and windings 31 and 32 have a certain impedance such that the ampere-turns of windings 43 and 44, respectively, are substantially equal. The impedance windings 41 and 42 will then have a certain impedance to control the current supplied to saturating winding 19. The turns of primary 14 and of secondary 12 of autotransformer 13, may be equal and, for a certain voltage of source 10 and a certain load current supplied to load 11, the impedance of windings 15 and 16 may be such that the current flowing through the transformer winding 14 and impedance windings 15 and 16 is equal to the current flow through primary 12 and the load 11, for example. In that case, the magnetomotive force set up in the core of the autotransformer 13 due to current in winding 14 is equal in magnitude and opposite in phase to the magnetomotive force set up in the core due to the current in winding 12. The phase and magnitude of the voltage across primary 12 is such that the load voltage will have the same magnitude as the supply voltage.

If the load voltage should increase due to an increase of line voltage, or due to a decrease of load, for example, there will occur an increase of voltage across resistor 63 and the current in saturating winding 34 will increase. The impedance of windings 31 and 32 will thus increase to reduce the current supplied to saturating winding 43. The impedance of windings 41 and 42 will increase to reduce the current supplied to saturating winding 19. As a result, the impedance of windings 15 and 16 increases and the current supplied from source 10 through autotransformer winding 14 decreases. Current from source 10 flowing through winding 14 sets up across winding 12 a voltage which aids or boosts the voltage of source 10 to tend to increase the load voltage and current from source 10 flowing through winding 12 sets up across winding 12 a voltage which opposes or bucks the voltage of source 10 to tend to decrease the load voltage. Therefore, the decrease of current supplied through winding 14 decreases the voltage across the load, thus minimizing the initially assumed increase of load voltage.

If the load voltage decreases, on the other hand, the current supplied to winding 34 will decrease to decrease the impedance of windings 31 and 32 and the current supplied to winding 43 will thus increase. The resulting decrease of impedance of windings 41 and 42 will cause an increase of current supplied to winding 19 and the impedance of windings 15 and 16 will decrease. The current supplied to winding 14 will thus increase to boost the load voltage, thus minimizing the initially assumed decrease of load voltage.

What is claimed is:

1. In an apparatus for supplying current from an alternating-current supply source to a load circuit including a load, means for deriving from said load circuit a first direct voltage which is substantially constant, means for deriving from said load circuit a second direct voltage which varies in response to load voltage changes and the percentage voltage variation of which is large with respect to the corresponding percentage voltage change of said load voltage, a saturable reactor comprising a core of magnetic material having thereon an impedance winding and two saturating wndings to which currents may be supplied for controlling the impedance of said impedance winding, means for impressing said first direct voltage upon a circuit comprising one of said saturating windings to set up a first unidirectional magnetomotive force in said core, means for impressing said second direct voltage upon a circuit comprising the other of said saturating windings to set up in said core a second unidirectional magnetomotive force opposed to said first magnetomotive force, means for supplying from said source to said impedance winding a pulsating current for setting up in said core a third unidirectional magnetomotive force, and means responsive to said pulsating current for controlling the voltage across said load.

2. In an apparatus for supplying current from an alternating-current supply source to a load circuit including a load, a first and a second rectifier each having input terminals and output terminals, transformer means for deriving from said load circuit and impressing upon the input terminals of said rectifiers respectively voltages larger than said load voltage, means for deriving from the output of said first rectifier a first direct voltage which is substantially constant, means connected to the output terminals of said second rectifier for setting up a second direct voltage equal to the output voltage of said second rectifier minus a substantially constant voltage, a saturable reactor having an impedance winding and two saturating windings wound on a core of magnetic material, means for impressing said first and second direct voltages upon circuits including said saturating windings respectively to set up opposing magnetomotive forces in said core, means for supplying unidirectional current derived from said source to a circuit including said impedance winding and means responsive to said unidirectional current for controlling the voltage across said load circuit.

3. In an apparatus for suppying current from an alternating-current supply source to a load circuit including a load, a first and a second rectifier each having input terminals and output terminals, transformer means having a primary connected across said load and secondary winding means for impressing upon the input terminals of said rectifiers respectively voltages larger than said load voltage, a circuit comprising resistance means and a thermistor in series connected to the output terminals of said first rectifier, a circuit comprising a varistor and a resistor in series connected to the output terminals of said second rectifier, a saturable reactor comprising an impedance winding and two saturating windings wound on a core of magnetic material, a circuit comprising one of said saturating windings connected across said thermistor, a circuit comprising the other of said saturating windings connected across said resistor, means for deriving from said load circuit and supplying unidirectional current to a circuit including said impedance winding, and means responsive to said unidirectional current for controlling the load voltage.

4. In combination, means for supplying current from an alternating-current supply source to a load which may vary, an autotransformer having a primary and a secondary, means for connecting said secondary in series with said source and said load, a first saturable reactor having a first impedance winding and a first saturating winding for controlling the impedance of said first impedance winding in response to direct current supplied to said first saturating winding, means for connecting said first impedance winding in series with said source and said primary to control the voltage across said load, a second saturable reactor having a second impedance winding and a second and a third saturating winding for controlling the impedance of said second impedance winding, a third saturable reactor having a third impedance winding and a fourth and a fifth saturating winding for controlling the impedance of said third impedance winding, each of said saturable reactors having a core of magnetic material, a first, a second, a third and a fourth rectifier, a first transformer having a first primary winding and a first and a second secondary winding, a second transformer having a second primary winding and a third and a fourth secondary winding, means for connecting said first and second primary windings across said load, means for connecting said first secondary winding to the input of said first rectifier, means for connecting said second secondary winding to the input of said second rectifier, a first, a second, a third, a fourth, a fifth and a sixth resistor, a thermistor, means for connecting said first resistor and said thermistor in series across the output of said first rectifier, a varistor, means for connecting said varistor and said second resistor in series across the output of said second rectifier, means for connecting said thermistor and said third resistor in series to said second saturating winding, means for connecting said second resistor to said third saturating winding, a series circuit comprising said third transformer winding, said second impedance winding, said fourth resistor, said fifth saturating winding and said third rectifier, a circuit comprising said fifth resistor and said fourth saturating winding in series connected to the output of said second rectifier, and a series circuit comprising said fourth secondary winding, said fourth rectifier, said first saturating winding and said sixth resistor.

5. In an apparatus for supplying current from an alternating-current supply source to a load circuit including a load, means for deriving from said load circuit a first direct voltage which is substantially constant, means for deriving from said load circuit a second direct voltage which varies in response to load voltage changes, a saturable reactor comprising a core of magnetic material and an impedance winding on said core, means for supplying a unidirectional current derived from said source to said impedance winding to set up a first unidirectional magnetomotive force in said core, means for setting up in said core a second magnetomotive force which varies in accordance with the difference of said first and second direct voltages so that said first and second magnetomotive forces may be equal, aiding or opposing depending upon the relative magnitudes of said first and second direct voltages, and means responsive to said unidirectional current for controlling the voltage across said load.

References Cited in the file of this patent
UNITED STATES PATENTS
2,569,605     Hall ------------------ Oct. 2, 1951